United States Patent [19]

Niessner et al.

[11] Patent Number: 5,795,926
[45] Date of Patent: Aug. 18, 1998

[54] PREPARATION OF FINELY DIVIDED POLYMER POWDERS

[75] Inventors: Manfred Niessner, Ludwigshafen; Norbert Grund, Ludwigshafen; Wilfried Heide, Freinsheim; Heinrich Hartmann, Limburgerhof, all of Germany

[73] Assignee: BASF Aktiengesellschaft, Ludwigshafen, Germany

[21] Appl. No.: 795,307

[22] Filed: Nov. 21, 1991

Related U.S. Application Data

[63] Continuation of Ser. No. 564,132, Aug. 8, 1990, abandoned.

[30] Foreign Application Priority Data

Aug. 8, 1989 [DE] Germany ............... 39 26 120.4

[51] Int. Cl.$^6$ .................................................. C08K 00/00
[52] U.S. Cl. ................... 523/339; 523/340; 524/801; 524/291; 524/555; 526/306; 428/402
[58] Field of Search ................ 524/801; 523/335, 523/339, 340; 494/37, 901; 210/787

[56] References Cited

U.S. PATENT DOCUMENTS

| | | | |
|---|---|---|---|
| 2,982,749 | 5/1961 | Friedrich et al. | 260/23 |
| 3,284,393 | 11/1966 | Vanderhoff et al. | |
| 3,642,019 | 2/1972 | Kramer et al. | |
| 3,734,873 | 5/1973 | Anderson et al. | 523/336 |
| 3,920,599 | 11/1975 | Hurlock et al. | 524/801 |
| 3,975,341 | 8/1976 | Trapasso | 526/911 |
| 4,059,552 | 11/1977 | Zweigle et al. | |
| 4,078,133 | 3/1978 | Ozima | |
| 4,125,508 | 11/1978 | Elfers | 523/339 |
| 4,459,396 | 7/1984 | Yamasaki et al. | 526/200 |
| 4,599,379 | 7/1986 | Flesher et al. | 524/801 |
| 4,645,568 | 2/1987 | Kurps et al. | 524/801 |
| 4,798,861 | 1/1989 | Johnson et al. | 524/801 |
| 5,124,376 | 6/1992 | Clark, Jr. | 524/801 |

FOREIGN PATENT DOCUMENTS

| | | |
|---|---|---|
| 1213307 | 2/1988 | Japan. |
| 1000307 | 8/1965 | United Kingdom. |
| 1319632 | 6/1973 | United Kingdom. |

OTHER PUBLICATIONS

Hawley's Condensed Chemical Dictionary, Van Nostrand Reinhold, NY, NY, 1987, p. 460.

*Primary Examiner*—Joseph L. Schofer
*Attorney, Agent, or Firm*—Oblon, Spivak, McClelland, Maier & Neustadt, P.C.

[57] ABSTRACT

A process is described for the preparation of finely divided polymer powders by polymerizing water-soluble monomers in the aqueous phase of a water-in-oil emulsion in the presence of water-in-oil emulsifiers and polymerization initiators, removing the water from the resultant water-in-oil polymer suspension by azeotropic distillation, and isolating the suspended, finely divided polymer powder, either the polymerization of the water-soluble monomers being carried out in the presence of from 0.1 to 10% by weight, based on the monomers employed in the polymerization, of protective colloids, or the protective colloids being added to the water-in-oil polymer suspension after the polymerization is complete. The polymerization is preferably carried out in the presence of surfactant. The finely divided pulverulent polymers are used as flocculants or thickeners for aqueous systems.

6 Claims, No Drawings

PREPARATION OF FINELY DIVIDED POLYMER POWDERS

This application is a Continuation of application Ser. No. 07/564,132, filed on Aug. 8, 1990, now abandoned.

The process of reverse suspension polymerization of U.S. Pat. No. 2,982,749 gives bead-form, water-soluble polymers by suspending an aqueous solution of monomers in a hydrophobic liquid using water-in-oil suspension agents and polymerizing the monomers therein in the presence of a polymerization initiator. The spherical polymer particles obtained are separated off and dried. The particle size of from about 100 to 500 μm causes no problems in the isolation of the polymer.

U.S. Pat. No. 3,284,393 discloses a process for the preparation of water-in-oil emulsion polymers in which the water-soluble monomers are emulsified in the presence of water-in-oil emulsifiers under -the action of high shear forces in an inert hydrophobic liquid and are then polymerized in the presence of free-radical polymerization initiators. The mean particle size of the polymers is, for example, 0.1 μm. The polymers cannot be isolated from such water-in-oil polymer emulsions by filtration or by centrifugation. Instead, it is necessary to remove the polymers from the emulsion by flocculation followed by filtration in order to obtain them in pure form. This process is not suitable for industrial utilization since the use of relatively large amounts of precipitants makes expensive cleaning of the oil phase necessary. Water-in-oil emulsions of water-soluble polymers are therefore used directly, in accordance with the teaching of U.S. Pat. No. 3,642,019, by inverting the water-in-polymer emulsion in an aqueous medium in the presence of a wetting agent, the polymer rapidly dissolving. It is disadvantageous here that the oil phase of the water-in-oil polymer emulsion is lost.

U.S. Pat. No. 4,059,552 discloses crosslinked, finely divided polymers whose particle diameter is less than 4 μm. These polymers are prepared from water-soluble, ethylenically unsaturated monomers in the presence of crosslinking agents by water-in-oil emulsion polymerization or by reverse suspension polymerization. In both processes, a special-purpose emulsifying apparatus is necessary to produce the low polymer particle size desired. The finely divided water-in-oil polymer emulsions are subjected to azeotropic distillation in order to remove water. The polymers are obtained by adding a flocculant to the pol Per suspension after azeotropic removal of water and then filtering off the polymer particles. As stated above, the use of a flocculant is technically complex.

German Laid-Open Application DE-OS 2,419,764 discloses the azeotropic removal of water from water-in-oil polymer emulsions to give nonaqueous polymer dispersions. The mean particle size of the polymers is from 0.01 to 1 μm. These finely divided dispersions have a long shelf life. The polymers cannot be isolated by filtration, decanting or centrifugation.

German Laid-Open Application DE-OS 2,557,324 discloses a process for the preparation of sedimentation-stable water-in-oil dispersions of acrylamide polymers. Wetting agents having an HLB value of greater than 10 and specific water-in-oil emulsifiers are used for this purpose. The polymers present in the emulsions cannot be isolated by filtration or centrifugation.

The process of German Laid-Open Application DE-OS 3,641,700 gives water-in-oil emulsions of cross-linked, water-swellable polymers by copolymerizing water-soluble, ethylenically unsaturated monomers with from 100 to 5,000 ppm, based on the monomer mixture, of an at least bifunctional crosslinking agent in the aqueous phase of a water-in-oil emulsion in the presence of a water-in-oil emulsifier and in the presence of an emulsifier having an HLB value of 10 or more using water-soluble polymerization initiators. The polymer cannot be isolated from such dispersions by simple filtration, decanting or centrifugation.

It is an, object of the present invention to provide a process for isolating finely divided polymer powders from water-in-oil polymer emulsions which is technically simpler to carry out than the processes known hitherto.

We have found that this object is achieved according to the invention by a process for the preparation of finely divided polymer powders by polymerizing water-soluble polymers in the aqueous phase of a water-in-oil emulsion in the presence of water-in-oil emulsifiers and free-radical polymerization initiators, removing the water from the resultant water-in-oil polymer suspension by azeotropic distillation, and isolating the suspended finely divided polymer powders, if the polymerization of the water-soluble monomers is carried out in the presence of from 0.1 to 10% by weight, based on the monomers employed in the polymerization, of protective colloids or if the protective colloids are added to the water-in-oil polymer emulsion in an amount of from 0.1 to 10% by weight, based on the polymer, after the polymerization is complete.

In a preferred embodiment, the polymerization of the water-soluble monomers is additionally carried out in the presence of from 1 to 20% by weight, based on the monomers employed in the polymerization, of one or more oil-in-water emulsifiers.

Any water-soluble, ethylenically unsaturated monomer can be employed in the polymerization. These monomers are, for example, ethylenically unsaturated $C_3$- to $C_6$-carboxylic acids, such as acrylic acid, methacrylic acid, itaconic acid, maleic acid, fumaric acid and methacrylic acid, and the amides of these carboxylic acids, in particular acrylamide and methacrylamide. Examples of further suitable water-soluble monomers are acrylamidomethylpropanesulfonic acid, vinylsulfonic acid, vinylphosphonic acid and vinyllactic acid.

Further suitable water-soluble, ethylenically unsaturated monomers are di-$C_1$- to $C_3$-alkylamino-$C_2$- to $C_6$-alkyl (meth)acrylates, such as dimethylaminoethyl acrylate, dimethylaminoethyl methacrylate, diethylaminoethyl acrylate, diethylaminoethyl methacrylate, dimethylaminopropyl acrylate, dimethylaminobutyl acrylate, dimethylaminoneopentyl acrylate and dimethylaminoneo-pentyl methacrylate. The basic acrylates can be subjected to the polymerization in the form of the salts with inorganic acids or carboxylic acids having from 1 to 4 carbon atoms, or alternatively in quaternized form. Olefinically unsaturated nitrites, such as acrylonitrile, are also suitable.

Also suitable are water-soluble diallylammonium compounds of the general formulae

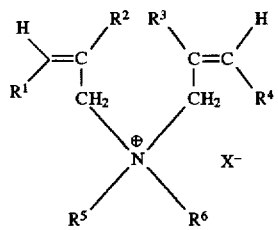

-continued

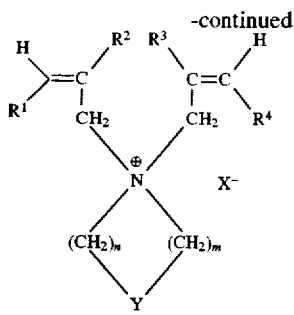

in which X⁻ is a halide ion, such as chloride, fluoride, bromide or iodide, or a hydroxide, nitrate, methylsulfate, hydrogensulfate or dihydrogenphosphate ion, n and m are integers from 1 to 2, preferably n=m=2, Y is >N-methyl, >N-ethyl, or preferably an oxygen atom or a >CH₂ group, and $R^1$, $R^2$, $R^3$ and $R^4$ are each hydrogen or alkyl having from 1 to 6 carbon atoms, and $R^5$ and $R^6$ are H or alkyl, which may be straight-chain or branched, having from 1 to 18 carbon atoms, preferably having from 1 to 6 carbon atoms, or aryl and/or benzyl.

Examples of diolefinically unsaturated monomers of this type are dimethyldiallylammonium chloride, dimethyldiallylammonium bromide, diethyldiallylammonium chloride, methyl-tert.-butyldiallylammonium methylsulfate, methyl-n-propyldiallylammonium chloride, dimethyldiallylammonium hydrogensulfate, dimethyldiallyammonium dihydrogenphosphate, di-n-butyldiallylammonium bromide, diallylpiperidinium bromide, diallylpyrrolidinium chloride and diallylmorpholinium bromide.

N-Vinylpyrrolidones, such as N-vinylpyrrolidone, are also suitable. N-Vinylformamide is also a suitable water-soluble monomer. It is copolymerized either alone or mixed with other ethylenically unsaturated monomers, for example with n-vinylpyrrolidone, acrylamide, methacrylamide, vinyl acetate, N-vinylimidazole, N-vinylimidazoline and/or dimethylaminoethyl acrylate.

In addition, suitable water-soluble monomers are N-vinylimidazolium compounds, which may be characterized, for example, using the following formula:

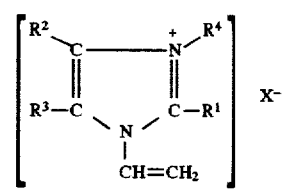

in which $R^1$, $R^2$ and $R^3$ are H or CH₃, and $R^1$ may additionally be C₂H₅, C₃H₇ or C₄H₉, and $R^4$ is H, C₁- to C₆-alkyl, benzyl or

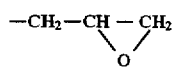

and X⁻ is an anion, such as Cl⁻, Br⁻, I⁻, methylsulfate, ethylsulfate, acetate, sulfate, hydrogensulfate or dihydrogenphosphate. From this class of compounds, the unsubstituted N-vinylimidazole in salt form is preferably used. Further suitable water-soluble monomers are N-vinylimidazolines, which may be characterized, for example, using the following general formula:

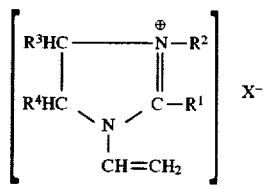     (I)

in which $R^1$ is H, C₁- to C₁₈-alkyl or

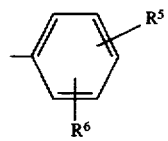

$R^5$ and $R^6$ are H, C₁- to C₄-alkyl or Cl,
$R^2$ is H, C₁- to C₁₈-alkyl,

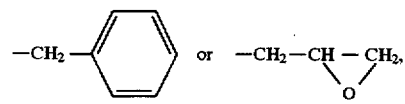

$R^3$ and $R^4$ are H or C₁- to C₄-alkyl, and
X⁻ is an acid radical.

From this group of compounds, 1-vinyl-2-imidazoline salts of the formula II

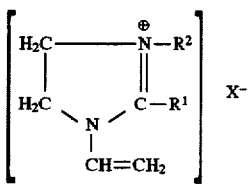     (II)

in which $R^1$ is H, CH₃, C₂H₅, n- or i-C₃H₇ or C₆H₅, and
X⁻ is an acid radical, are preferably employed in the polymerization. X⁻ is preferably Cl⁻, Br⁻, SO₄²⁻, HSO₄⁻, H₂PO₄⁻, CH₃O—SO₃⁻, C₂H₅—O—SO₃⁻ or $R^1$—COO⁻, and $R^2$ is H, C₁- to C₄-alkyl or aryl.

In principle, the substituent X⁻ in the formulae I and II may be any desired acid radical of an inorganic or organic acid. The monomers of the formula I are obtained by neutralizing the free base, ie. 1-vinyl-2-imidazolines, using the equivalent amount of an acid. The vinylimidazolines can also be neutralized, for example, using trichloroacetic acid, benzenesulfonic acid or toluenesulfonic acid. In addition to Isalts of 1-vinyl-2-imidazolines, quaternized 1-vinyl-2-imidazolines are also suitable. They are prepared by reacting 1-vinyl-2-imidazolines which are unsubstituted or substituted in the 2-, 4- and/or 5-position, with known quaternizing agents. Examples of suitable quaternizing agents are C₁- to C₁₈-alkyl chlorides or bromides, benzyl chloride, benzyl bromide, epichlorohydrin, dimethyl sulfate and diethyl sulfate. Preferred quaternizing agents are epichlorohydrin, benzyl chloride, dimethyl sulfate and methyl chloride.

Preferred water-soluble, ethylenically unsaturated ted monomers are diallyldimethylammonium chloride, acrylic acid, methacrylic acid, 2-acrylamido-2-methylpropanesulfonic acid, N-vinylpyrrolidone, acrylamide and methacrylamide. The monomers can be polymerized either alone to form homopolymers or mixed with one another to form copolymers. There is particular interest, for example, in copolymers made from acrylamide and acrylic acid, acrylamide and methacrylic acid, methacrylamide and acrylic acid, methacrylamide and methacrylic acid, acrylamide, acrylic acid and acrylamido-2-methylpropanesulfonic acid, acrylamide and dimethylaminoethyl acrylate, acrylamide and diethylaminoethyl methacrylate and methacrylamide and dimethylaminoethyl acrylate. The carboxylic acids and other ethylenically unsaturated acids, such as vinylsulfonic acid and acrylamidomethylpropanesulfonic acid, can be employed in the polymerization either in the form of the free acid, in partially neutralized form or in fully neutralized form. Examples of bases used for the neutralization of these monomers are sodium hydroxide solution, potassium hydroxide solution, ammonia and amines, such as triethylamine, butylamine, morpholine and ethanolamine.

The basic acrylates and methacrylates are preferably employed in the homopolymerization or copolymerization as the salt or in quaternized form. The basic acrylates and methacrylates are neutralized, for example, using hydrochloric acid, hydrobromic acid, sulfuric acid, phosphoric acid or a carboxylic acid, such as formic acid, acetic acid or propionic acid. In addition, the basic acrylates and methacrylates are employed in quaternized form. The quaternization products are obtained by quaternizing these compounds using customary quaternizing agents, such as methyl chloride, ethyl chloride, benzyl chloride, lauryl chloride, dimethyl sulfate, diethyl sulfate or epichlorohydrin.

The polymerization of the water-soluble monomers can also be carried out in the presence of crosslinking agents, which contain at least two non-conjugated, ethylenically unsaturated double bonds. Examples of suitable crosslinking agents are N,N'-methylenebisacrylamide, polyethylene glycol diacrylates and polyethylene glycol dimethacrylates, in each case derived from polyethylene glycols having a molecular weight of from 126 to 8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers made from ethylene oxide and propylene oxide, ethylene oxide and/or propylene oxide/trimethylolpropane addition products which have been diesterified or triesterified using acrylic acid or methacrylic acid, polyhydric alcohols which have been at least diesterified using acrylic acid or methacrylic acid, such as glycerol or pentaerythritol, triallylamine, tetraallylethylenediamine, divinylbenzene, diallyl phthalate, polyethylene glycol divinyl ether, trimethylolpropane diallyl ether, butanediol divinyl ether, pentaerythritol triallyl ether and/or divinylethyleneurea and/or triallylmonoalkylammonium salts, for example triallylmethylammonium chloride. Water-soluble crosslinking agents, for example N,N'-methylenebisacrylamide, polyethylene glycol diacrylates, polyethylene glycol dimethyacrylates, pentaerythritol diallyl ether and/or divinylurea, are preferably employed. The cross-linking agents are used in an amount of from 50 to 5,000 ppm, corresponding to about 0.003 to 0.3 mol. %, based on the monomers employed in the polymerization.

In order to polymerize the monomers, they are first dissolved in water in a concentration of from 20 to 80% by weight, preferably from 30 to 60% by weight. The aqueous solution is then emulsified in an inert hydrophobic liquid (oil phase) in the presence of at least one water-in-oil emulsifier to form a water-in-oil emulsion. Virtually any water-immiscible liquid which does not engage in the polymerization can be used as the inert hydrophobic liquid. For this purpose, aliphatic or aromatic hydrocarbons or mixtures of aliphatic or aromatic hydrocarbons are preferably used. Examples of suitable aliphatic hydrocarbons are pentane, hexane, heptane, octane, nonane, decane, cyclohexane, decalin, methylcyclohexane, isooctane and ethylcyclohexane. Examples of aromatic hydrocarbons which are used as the hydrophobic liquid in reverse suspension polymerization are benzene, toluene, xylene and isopropylbenzene. In addition, it is of course also possible to use halogenated hydrocarbons, such as tetrachloroethane, hexachloroethane, trichloroethane and chlorobenzene. Cyclohexane or hydrocarbons having a boiling range of from 60° to 170° C. are preferably used. The proportion of oil phase in the water-in-oil polymer emulsion is from 15 to 70% by weight, preferably from 20 to 60% by weight.

In order to disperse the aqueous monomer solution in the oil phase, the water-in-oil emulsifiers known for this purpose are used. These are, for example, sorbitan esters, such as sorbitan monostearate, sorbitan mono-oleate, sorbitan palmitate and sorbitan laurate, and glycerol esters whose acid component is derived from $C_{14}$- to $C_{20}$-carboxylic acids. Further suitable emulsifiers are the water-in-oil emulsifiers disclosed in German Patent 2,557,324, which can be obtained by reacting A) $C_{10}$–$C_{22}$-fatty alcohols with epichlorohydrin in the molar ratio 1:0.5 to 1:1.5 to give glycidyl ethers, B) reacting the glycidyl ethers with (1) saturated $C_2$–$C_6$-alcohols containing from 2 to 6 OH groups, or monoethers thereof with $C_{10}$–$C_{22}$-fatty alcohols, in the glycidyl ether:(1) or (2) molar ratio of from 1:0.5 to 1:6 in the presence of acids or bases, and C) alkoxylating the reaction products from (B) using at least one $C_2$–$C_4$-alkylene oxide in the molar ratio from 1:1 to 1:6.

The suitable water-in-oil emulsifiers have a maximum HLB value of 8. For the purposes of the invention, the HLB value is the hydrophilic-lipophilic balance of the emulsifier, cf. W. C. Griffin, J. Soc. Cosmet. Chem. Volume 1, (1949) 311. The water-in-oil emulsifiers are employed in an amount of from 2 to 20% by weight, preferably from 5 to 15% by weight, based on the monomers employed. The water-in-oil emulsifiers described in the abovementioned German Patent 2,557,324 are preferably employed.

Free-radical polymerization initiators which can be used are all polymerization initiators conventionally employed. Water-soluble initiators, such as alkali metal or ammonium peroxydisulfates, hydrogen peroxide, diacetyl peroxydicarbonate, dicyclohexyl peroxydicarbonate, tert.-butyl perpivalate, dilauroyl peroxide, dibenzoyl peroxide, tert.-butyl per-2-ethylhexanoate, tert.-butyl permaleate, bis (tert.-butyl peroxide)cyclohexane, tert.-butyl peracetate, dicumyl peroxide, di-tert.-amyl peroxide, di-tert.-butyl peroxide, cumyl hydroperoxide, tert.-butyl hydroperoxide and p-menthane hydroperoxide, and azo initiators, such as 2,2'-azobis(2-methyl-N-phenylpropionamidine) dihydrochloride, 2,2'-azobis(2-methylpropionamide) dihydrochloride, 2,2'-azobis(2,4-dimethylvaleronitrile), 2,2'-azobis(isobutyronitrile), 2,2'-azobis(2-amidinopropane) dihydrochloride and 2,2'-azobis [2-(2-imidazolin-2-yl) propane] dihydrochloride, are preferred. Preferred initiators are alkali metal persulfates, ammonium persulfates, tert.-butyl perpivalate, tert.-butyl per-2-ethylhexanoate, 2,2'-azobis(2,4-dimethylvaleronitrile), 2,2'-azobis(2-amidinopropane) dihydrochloride, azobis(isobutyronitrile) and 2,2'-azobis [2-(2-imidazolin-2-yl)propane] dihydrochloride. Either a single initiator or mixtures of several initiators can be used. The choice of initiators depends primarily on the temperature at which the polymerization is carried out. It is also possible to employ additional salts of heavy metals, for example salts of copper, cobalt, manganese, iron, nickel and chromium, and/or organic compounds, such as benzoin, dimethylaniline, ascorbic acid, and reducing agents, for example alkali metal disulfite or formaldehyde sodium sulfoxylate, together with at least one of the abovementioned free-radical polymerization initiators. Initiator mixtures of this type make it possible to carry out the polymerization at lower temperatures. The reducing component of so-called redox initiators can be formed, for example, from sodium sulfite, sodium bisulfite, sodium formaldehyde sulfoxylate or hydrazine. Based on the monomers employed in the polymerization, from 100 to 10,000 ppm, preferably from 100 to 2,000 ppm, of a polymerization initiator or a mixture of several polymerization initiators are required. The amounts of initiators specified correspond to about 0.003 to 0.3 mol. % of initiator, based on the monomers employed.

In a preferred embodiment of the invention, the polymerization of the water-soluble monomers is additionally carried out in the presence of at least one oil-in-water emulsifier. The use of this group of emulsifiers makes it possible to prepare particularly finely divided and sedimentation-stable water-in-oil polymer emulsions. Examples of suitable oil-in-water emulsifiers are all wetting agents which have an HLB value of 10 or more. This group of emulsifiers essentially comprises hydrophilic water-soluble compounds, such as ethoxylated alkylphenols or ethoxylated fatty alcohols. Products of this type are obtained, for example, by reacting $C_8$- to $C_{12}$-alkylphenols or $C_8$–$C_{22}$-fatty alcohols, preferably $C_{12}$–$C_{18}$-fatty alcohols, with ethylene oxide. The alkylphenol or fatty alcohol:ethylene oxide molar ratio is generally from 1:5 to 1:20. Examples of other suitable emulsifiers are alkoxylated fatty amines. If the emulsifiers employed in the polymerization have a HLB value of 10 or more, they are used in amounts of from 1 to 20% by weight, preferably from 2 to 15% by weight, based on the monomers to be polymerized.

The polymerization of the monomers takes place in the aqueous phase of a water-in-oil emulsion in the presence of water-in-oil emulsifiers and protective colloids usually employed in reverse suspension polymerization, and, if desired, oil-in-water emulsifiers and in the presence of free-radical polymerization initiators. The water is removed from the resultant water-in-oil polymer emulsions by azeotropic distillation.

A suspension of finely divided polymer powder in the oil phase is then obtained. The water content of the polymer suspension after the water-removal step is up to 15% by weight, preferably up to 10% by weight, based on the total suspension.

The essential feature of the process according to the invention is that the polymerization of the water-soluble monomers is carried out in the presence of from 0.1 to 10% by weight, based on the monomers employed in the polymerization, of protective colloids or that the protective colloids are added to the water-in-oil polymer suspension after completion of the polymerization at any desired time before isolation of the polymer powder. In the last-mentioned case, the amount of protective colloid is from 0.1 to 10% by weight, based on the polymer of the water-in-oil polymer emulsion before or after the water-removal step. Sorbitan esters can be employed both as a water-in-oil emulsifier and as a protective colloid. The water-in-oil emulsifiers used preferably belong to another class of compounds than the protective colloids. If, for example, a sorbitan ester is employed as the water-in-oil emulsifier, the protective colloid used is at least one of the polymeric compounds usually employed in reverse suspension polymerization as the protective colloid. In a preferred procedure, the water-in-oil emulsifier is one of the products suitable in German Patent 2,557,324 for the preparation of particularly stable water-in-oil polymer emulsions. The protective colloid employed in a case of this type is either a sorbitan ester or preferably a polymeric protective colloid usually used in reverse suspension polymerization. Particularly preferred protective colloids are sorbitan esters mentioned above under water-in-oil emulsifiers, and graft polymers, which are used in EP-A-0,290,753 as the protective colloid in reverse-suspension polymerization. The graft polymers can be obtained by grafting polymers (A) which contain, in copolymerized form, a) from 40 to 100% by weight of monovinylaromatic monomers, b) from 0 to 60% by weight of monoethylenically unsaturated carboxylic acids having from 3 to 6 carbon atoms, maleic anhydride and/or itaconic anhydride, and c) from 0 to 20% by weight of other monoethylenically unsaturated monomers, with the proviso that the sum of the percentages by weight a) to c) is always 100, with the monomers given below under (1) to (5). The polymers A) may either be homopolymers of monovinyl-aromatic monomers, such as styrene, or copolymers of monovinylaromatic monomers with an ethylenically unsaturated carboxylic acid or an anhydride of a monoethylenically unsaturated carboxylic acid.

Suitable components a) of the polymers A) are monovinylaromatic monomers, for example styrene, α-methylstyrene, α-alkylstyrenes having from 2 to 6 carbon atoms in the alkyl radical, which may be straight-chain and/or branched, for example α-isobutylstyrene. Also suitable are vinylaromatic compounds which carry, in addition to the vinyl group, a $C_1$- to $C_8$-alkyl group on the aromatic ring, for example vinyltoluene, tert.-butylstyrene, halostyrenes, ring (alkyl)-substituted α-alkylstyrenes having from 1 to 8 carbon atoms in the ring alkyl radical and having from 1 to 6 carbon atoms in the α-alkyl radical, for example para-tert.-butyl-α-methyl-styrene. From this group of monomers, styrene is preferred. It makes up from 40 to 100% by weight, preferably from 60 to 95% by weight, of the units in the polymer A).

The monomers of group b) include monoethylenically unsaturated carboxylic acids having from 3 to 6 carbon atoms, and/or anhydrides thereof, for example acrylic acid, methacrylic acid, ethacrylic acid, maleic acid, fumaric acid, itaconic acid, maleic anhydride, itaconic anhydride, vinyllactic acid, vinylphosphonic acid and vinylsulfonic acid. These monomers are employed either alone or in mixtures. From this group of monomers, acrylic acid, methacrylic acid, maleic anhydride and itaconic anhydride are preferred. The monomers of this group make up from 0 to 60% by weight, preferably from 5 to 40% by weight, of the units in the polymers A).

In addition to the monomers of groups a) and b), the polymers A) may also contain up to 20% by weight of other monoethylenically unsaturated monomers in polymerized form. This group of monomers includes, for example, the esters of acrylic acid, methacrylic acid and/or ethacrylic acid which are derived from alcohols having from 1 to 12 carbon atoms, for example methyl acrylate, methyl methacrylate, tert.-butylcyclohexyl acrylate, tert.-butylcyclohexyl methacrylate, cyclohexyl acrylate, cyclohexyl methacrylate, tert.-butyl acrylate, tert.-butyl methacrylate, n-butyl acrylate, n-butyl methacrylate, isobutyl acrylate, isobutyl methacrylate, 2-ethylhexyl acrylate, 2-ethylhexyl methacrylate and vinyl esters of saturated aliphatic carboxylic acids which contain from 2 to 20 carbon atoms, for example vinyl acetate, vinyl propionate, vinyl laurate, vinyl butyrate and vinyl stearate. Another group of monomers comprises the amides of methacrylic acid, acrylic acid and ethacrylic acid. These amides are, for example, methacrylamide or acrylamide, or N-substituted amides, such as N-tert.-butylmethacrylamede or N-tert.-butylacrylamide. A further class of monomers which may be involved in the construction of the polymer A) comprises acrylonitrile and methacrylonitrile. The monomers of group c) can be copolymerized in copolymer A) either alone or in mixtures in amounts of up to 20% by weight. The sum of the percentages a), b) and c) is in each case 100.

The polymers A) have a molecular weight (number average) of from 500 to 20,000 and hydrogenation iodine numbers (in accordance with DIN 53 241) of from 1.3 to 51, preferably from 2.5 to 25.4. It is particularly preferred to use polymers A) whose hydrogenation iodine numbers are from 5.1 to 16.9. The mean molecular weight (number average) of the polymers A) is preferably from 1,000 to 10,000. Preferred polymers A) are those which are sparingly soluble in aliphatic hydrocarbons having a boiling range of from 50° to 150° C.

Polymers of this type are known. They are prepared, for example, by homopolymerization or copolymerization of the monomers a) to c) in the solid phase at from 180° to 400° C., preferably from 200° to 300° C. Continuous solid-phase polymerization of the monomers is particularly preferred and is carried out in the stated temperature range and in particular at from 200° to 260° C. and at pressures of from 1 to 100 bar, preferably from 20 to 50 bar, in the absence of polymerization initiators or alternatively in the presence of polymerization initiators and polymerization inhibitors. Polymerization processes of this type are known, for example, from the following literature references: German Laid-Open Applications DE-OS 3,026,831 and DE-OS 3,046,476, and U.S. Pat. No. 4,042,768 and 4,414,370.

The polymers A) are used as the graft base for the preparation of the protective colloids to be employed according to the invention. The graft polymers are generally prepared by adding some of the polymerization initiator and some of the monomer mixture of the monomers (1) to (5), at elevated temperature, to the solution or dispersion of the polymers A) in an aliphatic and/or aromatic hydrocarbon (the solvents subsequently used in the reverse suspension polymerization as the hydrophobic inert liquid are preferably used), and adding the remainder of the monomers and the polymerization initiator after commencement of the polymerization.

The monomers of group (1) used are acrylates and/or methacrylates of monovalent alcohols having from 1 to 20 carbon atoms. Examples of monomers in this group are methyl acrylate, methyl methacrylate, ethyl acrylate, ethyl methacrylate, propyl acrylate, isopropyl acrylate, propyl methacrylate, n-butyl acrylate, sec.-butyl acrylate, tert.-butyl acrylate, tert.-butyl methacrylate, sec.-butyl methaciylate, n-butyl methacrylate, tert.-butylcyclohexyl acrylate, tert. -butylcyclohexyl methacrylate, cyclohexyl acrylate, 2-ethylhexyl acrylate, 2-ethylhexyl methacrylate and lauryl acrylate.

In addition, it is possible to use ethacrylates derived from monohydric alcohols having from 1 to 12 carbon atoms.

From this group of monomers, acrylates and/or methacrylates of monohydric alcohols containing from 3 to 6 carbon atoms are preferably used. The use of tert.-butyl acrylate, n-butyl acrylate and isobutyl acrylate, or mixtures thereof, in an amount of from 85 to 98% by weight, based on the monomer mixture grafted onto the polymer A) is very particularly preferred. The monomers of group (1) are generally employed in an amount of from 70 to 100% by weight, based on the monomers to be grafted on. In an only slight modification, the amount of monomers of group (1) is from 92.5 to 100% by weight.

Suitable monomers of the group (2) are monoethylenically unsaturated carboxylic acids having from 3 to 6 carbon atoms, and/or the anhydrides thereof. This group of monomers corresponds to the monomers of group b) of the polymers A), and comprises, for example, acrylic acid, methacrylic acid, ethacrylic acid, fumaric acid, the anhydrides of the carboxylic acids mentioned, and maleic anhydride. This group of monomers may be used as an additional component in the preparation of the graft polymers and is present in the monomer mixture grafted onto the polymer A) to the extent of from 0 to 15% by weight. From this group of monomers, acrylic acid, methacrylic acid, maleic anhydride or itaconic anhydride in an amount of from 0 to 7.5% by weight, based on the monomers, is preferably used.

Specific examples of monomers of group (3) which can be grafted onto the polymer A) are monoesters of acrylic acid and/or methacrylic acid of at least dihydric alcohols. These include, for example, hydroxyethyl acrylate, hydroxyethyl methacrylate, hydroxypropyl acrylate, hydroxypropyl methacrylate, hydroxybutyl acrylate and hydroxybutyl methacrylate. This group of monomers may, if desired, be used in the monomer mixture as an additional component in an amount of up to 10% by weight.

The polymer A) can be further modified by grafting-on monomers of group (4), which include mono-vinylaromatic compounds, which may be present in the monomer mixture in an amount of up to 15% by weight, preferably from 1 to 7.5% by weight. These monomers are identical with the monomers of group a) of the polymers A). From this group of monomers, styrene is preferably used.

In a further modification, the mixture of monomers grafted onto the polymer A) may contain, as monomers of group (5), up to 7.5% by weight of acrylamide and/or methacrylamide. The sum of the percentages by weight of the monomers of groups (1) to (5) is always 100. The monomers (1) to (5) are employed in an amount of from 97.5 to 50% by weight, preferably from 90 to 75% by weight, based on the mixture of polymer A) and the monomers (1) to (5), for the preparation of the graft polymers.

The graft polymerization is generally carried out at from 50° to 150° C., preferably from 60° to 120° C., in the presence of polymerization initiators, which are generally employed in an amount of from 0.01 to 6% by weight, preferably from 0.1 to 4% by weight, based on the weight of the polymers A) and the monomer mixture. The graft polymerization can be carried out at atmospheric pressure, superatmospheric pressure or reduced pressure.

Further protective colloids are block or graft polymers which contain at least one polymeric hydrophilic moiety and one polymeric hydrophobic moiety in the molecule. Such polymers are described in detail in German Laid-Open Application DE-OS 3,220,114. They contain, for example, from 70 to 98% by weight of a diene, such as cyclopentadiene, di-, tri- or tetracyclopentadiene or the $C_1$–$C_3$-alkyl-substituted derivatives thereof, and, as comonomer, maleic anhydride and/or monoesters of maleic acid derived from alkanols containing from 1 to 20 carbon atoms. These protective colloids can be prepared, if desired, using further copolymerizable monomers from the group comprising monoolefins containing from 2 to 12 carbon atoms, vinylaromatic compounds containing up to 12 carbon atoms, and, if appropriate, acrylates or methacrylates of alcohols having from 1 to 20 carbon atoms, acrylic acid, methacrylic acid, acrylonitrile, methacrylonitrile, vinyl acetate and/or vinyl propionate. Suitable protective colloids are also alternating copolymers made from maleic anhydride and diisobutene whose anhydride groups are fully or partially esterified with $C_1$–$C_{20}$-alcohols. The polymers which are suitable as protective colloids have K values of from 40 to 50 (determined by the method of H. Fikentscher, Cellulose-chemie, Volume 13, (1932) 58–64 and 71–74, in 1% strength solution in cyclohexanone).

The amount of protective colloid employed is from 0.1 to 10% by weight, preferably from 0.2 to 5% by weight, based on the monomers employed in the polymerization or on the polymer formed from the monomers.

The following process variants are suitable for the preparation of the finely divided polymer powders containing primary particles having a mean size of from 0.1 to 20 µm, preferably from 0.2 to 15 µm:

Variant 1

The aqueous monomer solution, which may contain a water-soluble polymerization initiator, is combined with the oil phase which contains a water-in-oil emulsifier in dissolved form and may also contain an oil-soluble polymerization initiator. The oil phase may additionally contain an oil-in-water emulsifier. The organic phase and the aqueous phase are processed using a disperser to form a water-in-oil emulsion, which is polymerized under a nitrogen atmosphere, if desired after the addition of a polymerization initiator. The polymerization can be carried out under superatmospheric pressure, reduced pressure or at atmospheric pressure. The main polymerization may be followed, if desired after further addition of initiator, by a postpolymerization, which can be carried out at a temperature the same as or above or below that of the main polymerization. After completion of the polymerization, the protective colloid, if desired dissolved in a hydrocarbon, for example cyclohexane, is added, and the water is removed from the reaction mixture by azeotropic distillation. The suspended, finely divided polymer powder is then isolated from the polymer suspension.

Variant 2

As described for variant 1, the aqueous monomer solution is emulsified in the oil phase, which contains a water-in-oil emulsifier and, if desired, a wetting agent and an oil-soluble polymerization initiator. If necessary, addition of the polymerization initiator may also be delayed until after the emulsification. This variant can be carried out using a mixture of a water-soluble and a water-insoluble initiator or using either a water-soluble initiator or a water-insoluble initiator. The protective colloid is then added, advantageously dissolved in an auxiliary oil phase, which is particularly suitable for azeotropic removal of water. The polymerization is then carried out as described for variant 1, followed by azeotropic removal of water and isolation of the suspended, finely divided polymer powder.

Variant 3

The aqueous monomer solution, the oil phase, which contains the above-described auxiliaries, and a solution of a protective colloid in an oil phase, for example cyclohexane, are combined and the mixture is emulsified giving a finely divided water-in-oil emulsion. If desired, a polymerization initiator is added, and the water-in-oil emulsion is polymerized under nitrogen as described for variant 2, the water is then removed from the water-in-oil polymer emulsion to give a polymer suspension, and the finely divided polymer is isolated therefrom. The removal of water can also be carried out concurrently with the polymerization if the latter takes place at the boiling point of the reaction mixture.

Variant 4

The aqueous monomer solution described for variant 1 and the oil phase containing auxiliaries are combined with one another and emulsified. In a polymerization reactor, a solution of a protective colloid in a hydrocarbon is heated under a nitrogen atmosphere to the desired polymerization temperature, an initiator is added if desired, and the previously prepared water-in-oil monomer emulsion is metered in over the course of about 0.5 to 5 hours. During the addition of the water-in-oil monomer emulsion, free-radical polymerization initiators are continuously metered in. Completion of the main polymerization may be followed by a postpolymerization. The water is subsequently removed from the water-in-oil polymer emulsion obtained in this way by azeotropic distillation, and the finely divided polymer is isolated from the suspension in the hydrocarbon.

The finely divided polymer is isolated by filtration or centrifugation. The process according to the invention gives pulverulent polymers which comprise loose agglomerates of primary particles. When introduced into water, the agglomerates, which have a minimum size of 50 µm, disintegrate into the primary particles, which have a mean particle size of from 0.1 to 20 µm.

The isolation of the finely divided polymers from water-in-oil emulsions or anhydrous polymer suspensions in a hydrocarbon oil can be considerably accelerated by adding an agglomeration aid. Agglomeration of the finely divided polymers is effected by adding suitable agglomeration aids in a maximum amount of 10% by weight, preferably a maximum amount of 5% by weight, based on the water-in-oil emulsion or polymer emulsion in a hydrocarbon oil. This considerably increases the sedimentation rate of the polymer. The increase in the concentration of solid polymer can also be detected from the formation of a phase interface separating a high-solids lower phase from a low-solids supernatant. Suitable agglomeration aids are preferably polar aprotic solvents. Suitable polar aprotic agglomeration aids have a dipole moment of greater than 2 debyes, preferably of greater than 3 debyes, in the gas phase (cf. Handbook of Chem. and Phys., 55th Edition, CRC Press Inc., Cleveland, 1974, pages E-63 ff) or in solution (cf. C. Reichert, Solvent effect in Org. Chem., Verlag Chemie, Weinheim, N.Y., 1979, pages 270 ff) or a solvent polarity parameter $E_T$ of greater than 35 kcal/mol, preferably 40 kcal/mol (cf. C. Reichert, Solvent effect in Org. Chem., 1979, pages 270 ff).

Examples of suitable agglomeration aids are ethylene glycol dimethyl ether, N-methylpyrrolidone, N,N-dimethylformamide, N,N-dimethylacetamide, acetonitrile, dimethyl sulfoxide, tetrahydrothiophene 1,1-dioxide, nitromethane, ethylene carbonate, propylene carbonate and mixtures of at least two of the compounds mentioned. The addition of the agglomeration aid means that the polymerization suspension can be filtered with less solid in the filtrate compared with the untreated suspension and that, in addition, the solid/liquid separation by centrifugation becomes possible in considerably shorter times than without addition.

High-molecular-weight, water-soluble polymers are used, for example, as flocculants for sludges or for clarifying effluent from industrial and communal sewage works. Crosslinked, water-swellable polymers can be employed to thicken aqueous systems, for example as thickeners in textile printing, for paper coating slips or for aqueous paint emulsions.

In the Examples, parts are parts by weight, and percentages are percent by weight. The particle sizes of the polymers are derived from scanning electron photo-micrographs. The determination was carried out on the polymer powders after azeotropic removal of water and drying under reduced pressure. The water content of the polymers here was less than 8% by weight.

The following substances, inter alia, were used in the Examples:

Water-in-oil emulsifier 1

This emulsifier was prepared by reacting

A) oleyl alcohol with epichlorohydrin in the molar ratio 1:1 to give oleyl glycidyl ether, B) reacting the oleyl glycidyl ether with glycerol in the molar ratio 1:1 in the presence of $BF_3$/phosphoric acid at 80° C. and removing the catalyst using a basic ion exchanger, and C) ethoxylating the reaction product from (B) using 2 mol of ethylene oxide.

Oil-in-water emulsifier 1

This is the product of the addition of 8 mol of ethylene oxide to 1 mol of nonylphenol, and has an HLB value of 12.5 measured by the method of W. C. Griffin, J. Soc. Cosmetic Chemists, Volume 1, (1949) 311.

Protective colloid 1

A mixture comprising the following constituents was introduced into a polymerization apparatus comprising a reactor equipped with a reflux condenser, thermometer, heating and cooling means, a stirrer and supply vessels and arranged for work under an inert-gas atmosphere, and was heated to reflux:

1,700 g of a polymer prepared by continuous polymerization of a monomer mixture comprising 83% of styrene and 17% of methacrylic acid at from 249 to 251° C. at a pressure of 24 mbar, and having a molecular weight of 1870, an acid number of 104 mg of KOH/g, a hydrogenation iodine number of 14 g per 100 g of polymer, and a softening point of 138° C., 532 g of maleic anhydride, 1,600 g of cyclohexane, 2,470 g of tert.-butyl acrylate and 65 g of tert.-butyl perpivalate.

A solution of 4,730 g of tert.-butyl acrylate and 568 g of styrene in 1,766 g of cyclohexane and simultaneously a solution of 260 g of tert.-butyl perpivalate in 833 g of cyclohexane were both added over the course of 2 hours after commencement of refluxing. When all the monomers and the polymerization initiator had been added, the reaction mixture was stirred for a further 2 hours under reflux and then diluted with cyclohexane. A protective colloid dispersion having a polymer content of 40% was obtained. The graft copolymer had a K value of 32.

Protective colloid 2

Copolymer comprising 89.4% of dicyclopentadiene, 5.9% of styrene and 4.7% of maleic anhydride and having a molecular weight of 900 and an iodine number of 70, cf. German Patent 2,710,372.

EXAMPLES

Composition of the aqueous monomer solution in Examples 1 to 9

262 g of water
200 g of acrylic acid
200 g of 25% strength aqueous ammonia solution,
50 g of 50% strength aqueous acrylamide solution,
0.18 g of methylenebisacrylamide,
0.45 g of formic acid and
72 g of the pentasodium salt of diethylenetriaminepentaacetic acid.

The pH of the monomer solution was adjusted to 8 by adding aqueous ammonia.

Composition of the organic phase in Examples 1 to 9
250 g of cyclohexane
x g of water-in-oil emulsifier 1 and
y g of oil-in-water emulsifier 1.

Example 1

After adding 0.375 ml of a 15% strength aqueous solution of 2,2'-azobis (2-amidinopropane) dihydrochloride to the monomer solution, the organic phase where x=20 and y=9 is added and a water-in-oil emulsion is prepared while passing nitrogen into the flask and is heated to from 50° to 55° C., to polymerize the monomers. The polymerization is complete after 120 minutes. A further 0.375 ml of the above-described aqueous solution of the initiator is then added, and the mixture is subsequently subjected to post-polymerization for 30 minutes at from 55° to 60° C.

5.7 g of sorbitan monooleate in 1 l of cyclohexane are introduced into a stainless steel reactor equipped with stirrer and water separator. The fully polymerized water-in-oil emulsion is added to this solution, and the water is removed by azeotropic distillation. A dispersion of a crosslinked, water-swellable polymer which rapidly settles out is obtained. Filtration and subsequent drying of the pulverulent polymer at 50° C. in vacuo gives a polymer comprising loose agglomerates of primary particles. The mean particle size of the primary particles, determined from scanning electron photomicrographs, is less than 2 µm.

Example 2

The procedure as in Example 1 is followed, the only exception being that x=15. Agglomerates of primary particles of the polymer which have a narrow grain size distribution and disintegrate rapidly in water are obtained. The mean particle size of the primary particles, determined in a scanning electron microscope, is about 1 µm.

Comparative Example 1

The procedure as in Example 1 is followed, the only exception being that only cyclohexane is initially introduced to the steel reactor, ie. the removal of water is carried out in the absence of sorbitan monooleate. During the azeotropic removal of water, a thick coating initially forms on the reactor wall and on the stirrer. The batch coagulates as the water removal proceeds.

General procedure for Examples 3 to 9

In order to prepare the monomer emulsion, an organic phase and 0.375 ml of a 15% strength aqueous solution of 2,2'-azobis (2-amidinopropane) dihydrochloride are added to the monomer solution in a glass reactor, and the mixture is emulsified for 1 hour while passing nitrogen through the batch.

5.7 g of sorbitan monooleate and 1 l of cyclohexane are introduced into a stainless steel reactor, the mixture is warmed to 52° C. while passing in nitrogen, and the polymerizable monomer emulsion is metered in over the course of 1 hour. 0.375 ml of a 15% strength aqueous solution of 2,2'-azobis (2-amidinopropane) dihydrochloride is added 30 minutes after addition of the monomer emulsion, and the emulsion is subjected after 1 hour to post-polymerization at 55° C. Water is then removed by azeotropic distillation, and the polymer is isolated as described in Example 1.

Example 3 x=20, y=9

The primary particles of the polymer formed have a broader grain size distribution than the particles obtained in Example 1. The mean particle size is in the region of 2 µm, and the maximum particle size is about 4 µm.

Comparative Example 2

The procedure as in Example 3 is followed, but the use of sorbitan monooleate as protective colloid before the azeotropic removal of water is omitted. The batch agglomerates during the removal of water. The majority of the polymer is produced as a coagulate.

Example 4 x=20, y=18

During the polymerization, slight coatings are produced on the reactor wall and on the stirrer. The primary particles of the polymer have a broad grain size distribution, and their mean particle size is less than 2 µm.

Example 5 x=20, y=23

After drying, loose agglomerates of primary particles are obtained. Individual spherical polymer particles have a mean diameter of less than 1.5 µm.

Example 6 x=20, y=28

Loose agglomerates of spherical primary particles which have a narrow particle size distribution and a mean size of less than 1 µm are obtained.

Example 7 x=15, y=7

A polymer is obtained in the form of spherical particles having a broad grain size distribution in the range from 0.2 to 5 µm.

Example 8 x=40, y=18

Predominantly large polymer particles having a diameter of up to 4 µm are obtained. In addition, small particles having a mean diameter of less than 0.5 µm are produced.

Example 9 x=40, y=33

Grain coatings form on the reactor wall and on the stirrer. The spherical primary particles of the polymer form cluster-like agglomerates. The individual particles have a narrow grain size distribution with a maximum of less than 1 µm.

Composition of the aqueous phase of the water-in-oil emulsion in Examples 10 to 13

170 g of water
200 g of acrylic acid
190 g of 25% strength aqueous ammonia solution
48 g of 50% strength aqueous acrylamide solution
89.6 mg of methylenebisacrylamide
0.12 g of formic acid and
72 mg of the pentasodium salt of diethylenetriaminepentaacetic acid Composition of organic phase I in Examples 10 to 13

250 g of cyclohexane
20 g of water-in-oil emulsifier 1 and
23 g of oil-in-water emulsifier 1

Composition of organic phase II in Examples 10 to 13

1,000 ml of cyclohexane and 5.4 g of protective colloid 1

Example 10

The aqueous phase, the organic phase I and 1.12 g of a 3% strength aqueous solution of 2,2'-azobis(2-amidinopropane) dihydrochloride are pre-emulsified for 1 hour at room temperature under a nitrogen atmosphere. Organic phase II is added, and the reaction mixture is warmed to 55° C., polymerized at this temperature for 2 hours and, after 1.9 g of a 3% strength aqueous solution of 2,2'-azobis(2-amidinopropane) dihydrochloride have been added, post-polymerized for one hour. Azeotropic removal of water, filtration and drying at 50° C. under reduced pressure give a pulverulent, crosslinked, water-swellable polymer. The scanning electron photomicrograph shows loose agglomerates of spherical primary particles with a diameter of less than 3 µm.

Example 11

The aqueous phase, organic phases I and II and 34 mg of 2,2'-azobis(2-amidinopropane) dihydrochloride are combined, stirred for 1 hour under a nitrogen atmosphere and thus emulsified. The monomer emulsion is subsequently warmed and the pressure is reduced until the reaction mixture boils at 55° C. The mixture is then polymerized at this temperature for 2 hours and, after 0.056 g of 2,2'-azobis (2-amidinopropane) dihydrochloride has been added, post-polymerized for a further hour. The azeotropic removal of water and the work-up are carried out as described in Example 10. A polymer in spherical primary particles having a mean particle size of 2 µm was obtained.

Example 12

A polymerizable monomer emulsion is prepared from the aqueous phase, organic phase I and 0.04 g of 2,2'-azobis (2-amidinopropane) dihydrochloride by stirring the mixture for one hour under nitrogen. Organic phase II is heated to 55° C. in a separate polymerization reactor and added to the monomer emulsion, and the mixture is polymerized for 1 hour. 1.88 g of a 3% strength solution of 2,2'-azobis(2-amidinopropane) dihydrochloride are added, and the mixture is post-polymerized for one hour, the water is removed by azeotropic distillation, and the mixture is worked up in accordance with the procedure described in Example 10. Agglomerates of spherical primary particles having a maximum particle size of 3 µm are obtained.

Example 13

Organic phase II is heated to 55° C., and a polymerizable monomer emulsion comprising the aqueous phase, organic phase I and 1.12 g of a 3% strength aqueous solution of 2,2'-azobis(2-amidinopropane) dihydrochloride is then added over the course of 1 hour. Completion is followed by post-polymerization and work-up as described in Example 12. A pulverulent polymer whose spherical primary particles have a mean particle size of less than 2 µm is obtained.

Aqueous phase in Examples 14 and 15

5,000 g of water
5,000 g of acrylic acid
5,275 g of 25% strength aqueous ammonia solution 1,200 g of 50% strength aqueous acrylamide solution
4.5 g of methylenebisacrylamide
11.3 g of formic acid and
1.8 g of the pentasodium salt of diethylenetriaminepentaacetic acid
Organic phase I in Examples 14 and 15
6.250 g of cyclohexane
500 g of water-in-oil emulsifier 1 and
575 g of oil-in-water emulsifier 1.
Organic phase II in Example 14
25 l of cyclohexane and 135 g of sorbitan monooleate
Organic phase II in Example 15
25 l of cyclohexane and 135 g of protective colloid 1

Example 14

Organic phase II is introduced into a reactor and heated while stirring, and the boiling point is adjusted to 60° C. by reducing the pressure. An aqueous monomer emulsion is prepared from the aqueous phase and organic phase I, substantially freed from oxygen and metered into the reactor over the course of 1 hour with continuous admixing of 650 ml of a 1% strength aqueous solution of 2,2'-azobis(2-amidinopropane) dihydrochloride. 150 ml of a 1% strength aqueous solution of 2,2'-azobis(2-amidino-propane) dihydrochloride are then added, and the reaction mixture is post-polymerized for 1 hour at 60° C. The water is then removed, and the mixture is filtered and dried in a vacuum drying cabinet. The polymer is obtained in the form of a powder whose primary particles have a broad grain size distribution. In the scanning electron microscope, a mean particle size of less than 5 μm is found.

Example 15

This Example differs from Example 14 merely through the composition of organic phase II (protective colloid 1 instead of sorbitan monooleate). Pulverulent polymers in which the polymer particles have a narrow grain size distribution in the scanning electron microscope and have a mean particle size of less than 1 μm are obtained.

Composition of the aqueous phase in Examples 16 to 21
393+x g of water
350 g of acrylic acid
340−x g of 25% strength aqueous ammonia solution
200 mg of methylenebisacrylamide and
120 mg of the pentasodium salt of diethylenetriaminepentaacetic acid
Composition of organic phase I in Examples 16 to 21
375 g of cyclohexane
m g of water-in-oil emulsifier 1 and
n g of oil-in-water emulsifier 1
Composition of organic phase II in Examples 16 to 21
1.5 l of cyclohexane and the amounts of protective colloid indicated in the individual Examples.

Example 16

$x=0$, $m=30$ and $n=15$

The aqueous phase is combined with organic phase I and 0.5 ml of a 15% strength aqueous solution of 2,2'-azobis (2-amidinopropane) dihydrochloride, and the mixture is pre-emulsified for 1 hour while passing nitrogen through the batch. The mixture is subsequently warmed to 55° C. and polymerized at this temperature for 2 hours, the same amount of the azo initiator is again added, and the mixture is post-polymerized for 1 hour. The reaction mixture is then added to organic phase II, which contains 5.7 g of sorbitan monooleate as protective colloid. Azeotropic removal of water, filtration and subsequent drying of the powder in a vacuum drying cabinet give a pulverulent, finely divided polymer. When introduced into water, the powder increases the viscosity considerably, and a clear, structureless gel is formed after a swelling time of a few minutes.

Example 17

$x=76$, $m=60$ and $n=15$

The aqueous phase is combined with organic phase I and with 1.2 ml of a 15% strength aqueous solution of 2,2'-azobis(2-amidinopropane) dihydrochloride, and the mixture is pre-emulsified for 1 hour. Nitrogen is then passed through the stirred monomer emulsion for 20 minutes. This polymerizable mixture is metered over the course of one hour into organic phase II, which was warmed to 55° C. and contained 8.6 g of sorbitan monooleate as protective colloid. A further 1.2 ml of the initiator solution are added 30 minutes after completion of the metered addition and the reaction mixture is post-polymerized for 1 hour at 60° C. The water is removed from the reaction mixture by azeotropic distillation, and the polymer is filtered off and dried in a vacuum drying cabinet. A pulverulent polymer which comprised loosely agglomerated, spherical primary particles having a mean particle size of less than 5 μm was obtained.

Example 18

$x=0$, $m=30$ and $n=35$

Example 17 is repeated, the only difference being that organic phase II contained 8.1 g of protective colloid 1 instead of sorbitan monooleate. A pulverulent polymer having the same properties as described in Example 16 is obtained.

Example 19

$x=130$, $m=45$ and $n=7.5$

A monomer emulsion is prepared from organic phase I, the aqueous phase and 1.1 ml of a 15% strength aqueous solution of 2,2'-azobis(2-amidinopropane) dihydrochloride, then aerated for 20 minutes using nitrogen and metered over the course of 1 hour into organic phase II, which contains no protective colloid. After 30 minutes, a further 1.1 ml of the 15% strength aqueous solution of the azo initiator are added, the mixture is post-polymerized for 1 hour, and 3 g of protective colloid 1 are added. The water is removed from the water-in-oil polymer emulsion, which can then easily be filtered. Filtration and drying gives a finely divided, pulverulent polymer having spherical primary particles.

Example 20

$x=200$, $m=45$ and $n=0$

The polymerization and work-up were carried out as described in Example 19. A finely divided, pulverulent polymer which had a strongly thickening action in water was obtained.

Example 21

$x=232$, $m=45$ and $n=0$

The polymerization and work-up were carried out as described in Example 19. A finely divided, pulverulent polymer which had a strongly thickening action in water was obtained.

Example 22

The monomer solution is prepared from 190 g of water, 200 g of acrylic acid, 1,000 mg of a polyethylene glycol diacrylate whose polyethylene glycol segment had a mean molecular weight of 1,500 g/mol, 70 ml of the pentasodium salt of diethylenetriaminepentaacetic acid and 217 g of 50% strength aqueous sodium hydroxide solution with cooling, and is then combined with the organic phase, comprising 250 g of cyclohexane, 20 g of water-in-oil emulsifier 1 and 23 g of oil-in-water emulsifier 1, and pre-emulsified for 1 hour while passing nitrogen through the batch. After 24.6 ml of a 3% strength aqueous solution of 2,2'-azobis(2-amidinopropane) dihydrochloride has been added, the polymerizable mixture is metered over the course of 1 hour into 1 l of cyclohexane kept at 50° C. and containing 5.4 g of protective colloid 1 in dissolved form. When the addition of the polymerizable mixture is complete, the reaction mixture is post-polymerized for 1 hour, 1.88 g of 3% strength aqueous initiator solution are added, and the mixture is post-polymerized for a further hour at 50° C. The reaction mixture was worked up as in Example 17. A finely divided, pulverulent polymer which comprised loosely agglomerated, spherical primary particles having a mean particle size of less than 2 μm was obtained.

Preparation of water-soluble polymers

The K values given in the Examples below were determined by the method of H. Fikentscher, Cellulose Chemie, Volume 13, (1932), 58–64 and 71–74; in the Examples, K=k·10³. The K values were determined at 25° C. at a polymer concentration of 0.1% in 5% strength sodium chloride solution.

Example 23

An aqueous phase is first prepared by introducing 200 g of acrylic acid, 72 mg of the pentasodium salt of diethylenetriaminepentaacetic acid and 202 g of 25% strength aqueous ammonia solution into 178 g of water. The organic phase is obtained by mixing 250 g of cyclohexane, 20 g of water-in-oil emulsifier 1 and 23 g of oil-in-water emulsifier 1. The aqueous phase is combined with the organic phase, the mixture is emulsified for 1 hour while passing nitrogen through the batch, and the emulsion is subsequently combined with 24.6 g of a 3% strength aqueous solution of 2,2'-azobis(2-amidinopropane) dihydrochloride.

A solution of 5.4 g of protective colloid 1 in 1,000 ml of cyclohexane is then heated to 50° C. in a steel reactor, and the pressure is reduced until the solution boils at this temperature. The polymerizable water-in-oil monomer emulsion is then added to the boiling solution over the course of 5 minutes, the mixture is polymerized for one hour at 50° C., 1.88 g of the 3% strength initiator solution are then added, post-polymerization is carried out for 1 hour at 50° C., and the water is removed from the reaction mixture by azeotropic distillation. The reaction mixture is cooled, and the polymer is filtered off and dried in a vacuum drying cabinet. A finely divided, pulverulent polymer which comprises loosely agglomerated primary particles having a mean particle size of less than 2 μm and dissolves rapidly on introduction into water is obtained. The K value is 197. The polymer can be used as a flocculant, sizing agent or washing aid.

Example 24

An aqueous phase is first prepared by dissolving 200 g of acrylic acid, 0.072 g of the pentasodium salt of diethylenetriaminepentaacetic acid and 217 g of 50% strength aqueous sodium hydroxide solution in 248 g of water. The organic phase, the preparation of the emulsion, the polymerization and the work-up are carried out as described in Example 23. A finely divided polymer in the form of loosely agglomerated primary particles having a mean particle size of 3 μm is obtained. The finely divided polymer dissolves rapidly on introduction into water. The polymer has a K value of 198.2 and is suitable as a flocculent for sludges.

Example 25

An aqueous phase is prepared by dissolving 1.53 mol (110 g) of acrylic acid in 117 g of water, neutralizing the solution to a pH of 7.0 by adding 50% strength aqueous sodium hydroxide solution, then adding 418 g of a 50% strength aqueous solution of acrylamide, 200 mg of the pentasodium salt of diethylenetriaminepentaacetic acid and 0.2 g of formic acid. The aqueous monomer phase is then mixed with stirring with an organic phase comprising 250 g of cyclohexane, 26.7 g of water-in-oil emulsifier 1 and 20 g of oil-in-water emulsifier 1.81 g of a 3% strength aqueous solution of 2,2'-azobis (2-amidinopropane) dihydrochloride are then added, and a pre-emulsification is carried out by aerating the mixture for 1 hour with nitrogen.

A solution of 16 g of protective colloid 1 in 1,000 ml of cyclohexane is warmed to 65° C. in a polymerization apparatus, and the pressure is reduced until the solution refluxes. The polymerizable monomer emulsion is then metered into the flask at this temperature over the course of 1 hour and polymerized for a further hour, the water is removed by azeotropic distillation, and the polymer is isolated by filtration. A finely divided polymer which comprises spherical primary particles having a mean particle size of less than 10 μm is obtained. On introduction into water, the polymer dissolves rapidly. It has a K value of 162 and is used as a flocculant for sludge dewatering in mining.

Example 26

An aqueous phase is prepared by mixing 500 g of 50% strength aqueous acrylamide solution, 200 ml of water, 500 ppm of the pentasodium salt of diethylenetriaminepentaacetic acid and 0.1 mol of formic acid. The organic phase is obtained by dissolving 15 g of water-in-oil emulsifier 1 and 10 g of oil-in-water emulsifier 1 in 250 g of cyclohexane. The aqueous phase and the organic phase are combined with one another, 0.025 mol% of 2,2'-azobis [2-(2-imidazolinyl) propane] dihydrochloride is added, and the mixture is emulsified for 1 hour while passing nitrogen through the batch. The polymerizable emulsion is then processed further as described in Example 25, except that the amount of protective colloid is 10.6 g and the polymerization is carried out at 40° C.

After work-up, a finely divided, pulverulent polymer which predominantly comprises agglomerates 100 to 200 μm in size formed from primary particles having a mean particle size of about 5 μm is obtained. The high-molecular-weight, very readily water-soluble polyacrylamide has a K value of 215.3 and is suitable as a flocculant. It is primarily used for flocculating acidic effluents or sludges.

General preparation procedure for Examples 27 to 30

The aqueous phase is prepared as described in detail in Examples 27 to 30, and mixed with an organic phase which comprises 250 g of cyclohexane, 20 g of water-in-oil emulsifier 1 and 15 g of oil-in-water emulsifier 1. The amounts of free-radical polymerization initiator indicated in the Examples are added in the form of a 3% strength aqueous solution, and the mixture is in each case emulsified for 1 hour while passing nitrogen through the batch. 1,000 ml of cyclohexane containing in each case 2% of protective colloid 1, based on the monomers employed, in dissolved form are subsequently added. The solution of protective colloid is warmed, and the pressure is reduced until the reaction mixture refluxes at the polymerization temperature indicated in each case in the Examples. The mixture is polymerized for 2 hours and the water is subsequently removed by azeotropic distillation. The mixture is filtered, and the residue is dried in a vacuum drying cabinet to give a finely divided, pulverulent powder which comprises an agglomeration of spherical primary particles.

Example 27

0.52 mol of 2-acrylamido-2-methylpropanesulfonic acid is introduced into 170 ml of water, and the mixture is fully neutralized by adding 50% strength aqueous sodium hydroxide solution. 240 g of a 50% strength aqueous acrylamide solution, 6 g of formic acid and 52 mg of the pentasodium salt of diethylenetriaminepentaacetic acid are then added. 0.15 mol % of potassium peroxydisulfate is added, and the reaction mixture is polymerized at 60° C. A polymer having a K value of 86 is obtained and comprises an agglomeration of primary particles having a mean particle size of about 5 µm.

Example 28

250 mmol of sulfuric acid are introduced into 189 g of water, 500 mmol of dimethylaminoethyl acrylate are added with cooling, and 332 g of a 50% strength aqueous acrylamide solution, 2.9 g of formic acid and 108 mg of the pentasodium salt of diethylenetriaminepentaacetic acid are then added. 0.06 mol % of 2,2'-azobis (2-amidinopropane) dihydrochloride is then added, and the mixture is polymerized at 60° C. A finely divided, pulverulent and readily water-soluble polymer which comprises an agglomeration of primary particles having a mean particle size of less than 3 µm and has a K value of 151.1 is obtained. The cationic polyacrylamide is suitable as a flocculant for dewatering communal sewage sludges.

Example 29

The aqueous phase comprises a mixture of 178 g of water, 322 g of 50% strength aqueous acrylamide solution, 83.5 g of diethylaminoethyl acrylate, 55.6 g of 32% strength aqueous hydrochloric acid, 48 mg of the pentasodium salt of diethylenetriaminepentaacetic acid and 0.58 g of formic acid. The polymerization is carried out at 60° C. using 0.06 mol% of 2,2'-azobis (2-aminopropane) dihydrochloride. The polymer has a K value of 123.8 and is produced in the form of loose agglomerates of primary particles having a mean particle size of less than 4 µm. The polymer is used as a strengthening agent for paper.

Example 30

The aqueous phase comprises a mixture of 322 g of water, 192 g of acrylamide, 21 g of formic acid, 70 mg of the pentasodium salt of diethylenetriaminepentaacetic acid and 48 g of dimethylaminoethyl acrylate methylchloride. The initiator employed was 0.09 mol % of 2,2'-azobis (2-amidinopropane) dihydrochloride. The polymerization was carried out at 70° C. A finely divided polymer which dissolves rapidly on introduction into water and has a K value of 124.6 was obtained. The polymer is suitable as a flocculant for sewage sludges.

Work-up of commercially available water-in-oil polymer emulsions

General procedure for isolating pulverulent polymers from water-in-oil emulsions The amounts given below of water-in-oil polymer emulsions of water-soluble or water-swellable polymers are stirred into a mixture of 800 ml of cyclohexane and 3% by weight, based on the polymer content of the water-in-oil emulsion, of a protective colloid specified in each case in the examples, the mixture is warmed, and the water is removed by azeotropic distillation. The pulverulent polymer is then isolated by filtration and subsequent drying in a vacuum drying cabinet.

Example 31

380 g of the commercially available water-in-oil polymer emulsion LUTEXAL HP having a polymer content of 22.5% by weight are treated in the abovementioned manner using protective colloid 1. While the untreated water-in-oil polymer emulsion flows in unchanged form through the filter, the polymer from the water-in-oil polymer emulsion treated according to the invention can be filtered off.

The LUTEXAL HP water-in-oil emulsion is a synthetic thickener for textile printing. The thickening action of the pulverulent polymer isolated by the process according to the invention is, based on the polymer content, identical with the thickening action of the water-in-oil emulsion, ie. the effectiveness of the polymers is fully retained.

Example 32

The water is removed from 350 g of a commercially available water-in-oil emulsion LUTEXAL HEF having a polymer content of 25% by weight by azeotropic distillation in the presence of protective colloid 2. The polymer suspension after the water removal can be filtered within one hour. Drying of the residue under reduced pressure gives an agglomeration of a finely divided powder which, as a thickener, based on the polymer content, has the same action as the water-in-oil polymer emulsion.

It is not possible to isolate the polymer by filtering the commercially available water-in-oil emulsion since the emulsion runs in unchanged form through the filter.

Example 33

The water is removed from 180 g of a commercially available water-in-oil emulsion ALKOPRINT PTG having a polymer content of 38% by weight by azeotropic distillation at from 73° to 80° C. in the presence of protective colloid 1. The polymer can be filtered off from the dewatered emulsion using a paper filter, while the untreated water-in-oil emulsion flows through the filter within a few seconds under the same conditions without forming a residue on the filter.

An effectiveness comparison when used as thickeners for pigment printing shows, based on the polymer content, no difference between the pulverulent polymer isolated from the emulsion and the commercially available, untreated water-in-oil emulsion.

Example 34

The water is removed from 350 g of a commercially available water-in-oil emulsion of a cationic polyacrylamide POLYMIN KE 20 having a polymer content of 35% by weight by azeotropic distillation at from 73° to 80° C. in the presence of protective colloid 1. All the polymer can be isolated by filtering for 5 minutes through a paper filter and subsequently drying the residue in a vacuum drying cabinet. By contrast, the untreated water-in-oil emulsion flows through the filter used within a few seconds without the separation. A test of the retention and water-removal action during paper manufacture shows, based on the polymer employed in each case, absolutely no differences between

23 the pulverulent polymer isolated according to the invention and the untreated, commercially available water-in-oil emulsion.

Example 35

The water is removed from 160 g of a commercially available water-in-oil emulsion of a cationic polyacrylamide having an active compound content of 40% by azeotropic distillation at from 75° to 80° C. using protective colloid 2. The polymer emulsion after water removal is filtered through a pressure filter. A pulverulent, finely divided, readily water-soluble polymer is obtained which, based on the polymer content, gives the same results when tested for flocculation and water-removal action as does the untreated water-in-oil polymer emulsion. The commercially available, untreated water-in-oil emulsion flows through the filter used within a few minutes without leaving a residue.

Example 36

The water is removed from 160 g of a commercially available water-in-oil emulsion of a cationic water-soluble polymer FLOERGER PUROMAX EM 335 by azeotropic distillation at from 75° to 80° C. in the presence of protective colloid 2. Filtration using a polypropylene filter having a mesh width of 50 µm proceeds smoothly within 45 minutes. It is not possible to isolate any polymer from the untreated water-in-oil polymer emulsion using the filter described. Based on solid polymer, pulverulent polymers isolated by the treatment according to the invention and the commercially available water-in-oil polymer emulsion produce the same effectiveness.

Example 37

The water is removed from 160 g of a commercially available water-in-oil emulsion of an anionic polyacrylamide NALCO 8840 by azeotropic distillation at a maximum of 80° C. in the presence of protective colloid 2. The polymer can be filtered off from the dewatered polymer emulsion within 4 minutes. By contrast, the commercially available water-in-oil polymer emulsion flows through the filter within a few seconds without leaving a residue.

Example 38

The procedure followed is as in Example 37, the only exception being that protective colloid 1 is employed. After azeotropic removal of water, the suspension settles out and can be filtered within 3 minutes. By contrast, the untreated water-in-oil polymer emulsion is stable to sedimentation and flows through the filter without leaving a residue.

Isolation of pulverulent polymers from water-in-oil polymer emulsions by additionally using an agglomeration agent General procedure for Examples 39 to 48

An organic phase comprising 375 g of cyclohexane, 30 g of water-in-oil emulsifier 1, 35 g of oil-in-water emulsifier 1 and 8.1 g of protective colloid 1 is added to an aqueous phase comprising 350 g of acrylic acid, neutralized using the equivalent amount of a 25% strength aqueous ammonia solution, 35 g of acrylamide, 0.3 g of methylenebisacrylamide, 120 mg of the pentasodium salt of diethylenetriaminepentaacetic acid, 0.68 g of formic acid and 385 ml of water. 1.1 ml of a 15% strength aqueous solution of 2,2'-azobis(2-amidinopropane) dihydrochloride are added, and the mixture is emulsified for 1 hour at room temperature while passing nitrogen through the batch, warmed to 55° C. and polymerized at this temperature over the course of 2 hours. 9 ml of a 1% strength aqueous solution of 2,2'-azobis(2-amidinopropane) dihydrochloride are added, and the mixture is post-polymerized for a further hour. 1,500 ml of cyclohexane are added, and the water is removed by azeotropic distillation. In this way, a finely divided polymer suspension which does not tend to settle out is obtained.

Examples 39 TO 43

In each case, 100 g of the above-described sedimentation-stable polymer suspension are removed and mixed with 1 g of a solvent indicated in Table 1. After the time indicated in Table 1, the proportion by volume of the high-solids lower phase, based on the starting suspension, is determined in each case.

TABLE 1

| Example | Solvent | Experimental time [h] | Proportion by volume [%] | $E_T$[1] [kcal/mol] |
|---|---|---|---|---|
| 39 | Ethylene glycol dimethyl ether | 3 16 | 100 100 | 38.2 |
| 40 | N-methyl-pyrrolidone | 3 16 | 83 78 | 42.2 |
| 41 | N,N-dimethyl-formamide | 3 16 | 80 75 | 43.8 |
| 42 | Acetonitrile | 3 16 | 80 65 | 46.0 |
| 43 | Dimethyl sulfoxide | 3 16 | 50 35 | 45.0 |

[1]$E_T$ value determined by the method of Dimroth and Reichardt

Examples 44 TO 48

100 g of the dewatered suspension are mixed with 1 g of the solvents indicated in each case in Table 2. The suspension is then centrifuged for 1 minute or 3 minutes at 3,000 rpm, and the proportion by volume of the high-solids lower phase is then determined and the turbidity of the supernatant is assessed. The experimental procedure and the results are shown in Table 2.

TABLE 2

| Example | Solvent | Experimental time [h] | Proportion by volume [%] | Supernatant |
|---|---|---|---|---|
| 44 | Ethylene glycol dimethyl ether | 1 3 | 100 100 | — — |
| 45 | N-methyl-pyrrolidone | 1 3 | 84 53 | cloudy cloudy |
| 46 | N,N-dimethyl-formamide | 1 3 | 78 38 | cloudy cloudy |
| 47 | Acetonitrile | 1 3 | 76 38 | clear clear |
| 48 | Dimethyl sulfoxide | 1 3 | 88 26 | slightly cloudy slightly cloudy |

General procedure for Examples 49 to 59

To prepare the aqueous phase, 350 g of acrylic acid are neutralized using the equivalent amount of a 25% strength aqueous ammonia solution, and 35 g of acrylamide, 0.3 g of methylenebisacrylamide, 120 mg of the pentasodium salt of diethylenetriaminepentaacetic acid, 0.68 g of formic acid and 385 ml of water are subsequently added. An organic phase comprising 375 g of cyclohexane, 30 g of water-in-oil emulsifier 1, 35 g of oil-in-water emulsifier 1 and 8.1 g of protective colloid 1 is subsequently added to the aqueous phase. 1.1 ml of the 15% strength aqueous solution of 2,2'-azobis(2-amidinopropane) dihydrochloride are added, and the mixture is pre-emulsified for 1 hour at room temperature while passing nitrogen through the batch, and warmed to 55° C., and the emulsion is polymerized for 2 hours at this temperature. 9 ml of a 1% strength aqueous solution of 2,2'-azobis(2-amidinopropane) dihydrochloride are added, and the reaction mixture is post-polymerized for a further hour. 750 ml of cyclohexane are then added, and the water is removed by azeotropic distillation. A sedimentation-stable, finely divided polymer suspension is obtained.

100 g of this polymer suspension are mixed with 1 g of a solvent indicated in each case in Table 3, and the mixture is centrifuged at 3,000 rpm. The proportion by volume of the high-solids phase, based on the starting suspension, is then determined in each case, and the turbidity of the supernatant is assessed. The solvents used and the results are shown in Table 3.

TABLE 3

| Example | Solvent | $E_T$ [kcal/mol] | Experimental time [min] | Proportion by volume [%] | Turbidity[a] |
|---|---|---|---|---|---|
| 49 | N,N-Dimethylacetamide | 43.8 | 1 | 100 | 3 |
|   |   |   | 3 | 92 |   |
| 50 | Sulfolane[b] | 44.0 | 1 | 77 | 1 |
|   |   |   | 3 | 43 |   |
| 51 | Dimethyl sulfoxide | 45.0 | 1 | 90 | 2 |
|   |   |   | 3 | 38 |   |
| 52 | Acetonitrile | 46.0 | 1 | 52 | 3 |
|   |   |   | 3 | 38 |   |
| 53 | Nitromethane | 46.3 | 1 | 100 | 2 |
|   |   |   | 3 | 38 |   |
| 54 | Ethylene carbonate | — | 1 | 42 | 1 |
|   |   |   | 3 | 32 |   |
| 55 | Formic acid | — | 1 | 100[c] | 4 |
|   |   |   | 3 | 14 |   |
| 56 | Acetic acid | 51.2 | 1 | 90 | 4 |
|   |   |   | 3 | 90 |   |
| 57 | Trichloroacetic acid | — | 1 | 38 | 3 |
|   |   |   | 3 | 32 |   |
| 58 | Triethanolamine | — | 1 | 95 | 4 |
|   |   |   | 3 | 95 |   |
| 59 | Propylene carbonate | 46.6 | 1 | 53 | 1 |
|   |   |   | 3 | 40 |   |

[a] Assessment of turbidity:
1 clear
2 slightly cloudy
3 cloudy
4 very cloudy
[b] Tetrahydrothiophene 1,1-dioxide
[c] Considerable agglomeration and product damage

Example 60

1,000 ml of the anhydrous suspension obtained in accordance with the general procedure for Examples 39 to 48 were mixed with 8 g of dimethyl sulfoxide and, after 2 hours, filtered in a pressure filter through a polypropylene filter fabric at an excess pressure of 2 bar. The filtrate is substantially free from turbidity, and the filtration is complete after 65 minutes. When dimethyl sulfoxide is added, the filtration is complete after 8 hours.

Example 61

400 ml of cyclohexane containing 1.3 g of protective colloid 1 are added to 90 g of a commercially available water-in-oil polymer emulsion Alcoprint PTG, and the water is removed by azeotropic distillation. 180 g of the resultant polymer suspension were mixed with 1.8 g of dimethyl sulfoxide, and, 15 minutes after the dimethyl sulfoxide had been added, the mixture was filtered through a paper filter in a pressure filtration apparatus. The filtrate was clear, and the filtration was complete after 45 minutes.

Example 62

450 ml of cyclohexane containing 2.3 g of protective colloid 1 in dissolved form are added to 110 g of a commercially available water-in-oil polymer emulsion Alcoprint PTF, and the mixture is heated at reflux for 30 minutes. After cooling, 7.2 g of acetonitrile are added to the polymer suspension, the mixture is left to settle for 30 minutes, the clear supernatant is decanted off, and the mixture is filtered through a paper filter in a pressure filtration apparatus. Filtration is complete after 100 minutes, and the filtrate is clear. Applicational examples—use of the polymer powders as thickeners in textile printing

Example 63

10.5 g of the pulverulent polymer obtained as described in Example 1 are scattered with stirring into 857.5 g of water (15° German hardness). The mixture is subsequently stirred for four minutes using a high-speed stirrer at 10,000 revolutions per minute, to give a clear, highly viscous paste in which the thickener is fully swollen through. Then, 100 g of a commercially available binder based on a 50% strength copolymer dispersion comprising butyl acrylate, acrylonitrile and N-methylolmethacryl-amide, 5 g of a commercially available pigment printing emulsifier based on an arylpolyglycol ether, 7 g of a commercially available plasticizer based on a polydimethylsiloxane and 20 g of the blue pigment dye with Colour Index No. 74160 are added, and the mixture is stirred for a further minute at 10,000 revolutions per minute.

The printing paste obtained is subsequently printed onto a cotton fabric using a flat film printing screen. The fabric is then dried for two minutes at 100° C. and fixed for 5 minutes using hot air at 150° C. A blue, intensely colored, level print with sharp contours, a soft hand and good rub, washing and dry-cleaning fastness properties is obtained.

Example 64

10.8 g of the pulverulent polymer prepared as described in Example 2 are scattered with stirring into 849.2 g of drinking water. The mixture is stirred for three minutes using a high-speed stirrer at 8,000 revolutions per minute to give a clear, highly viscous paste in which the thickener is fully swollen through. Then, 110 g of a commercially available binder based on a 50% strength copolymer dispersion comprising butyl acrylate, acrylonitrile and N-methylolmethacrylamide, 10 g of a commercially available plasticizer based on a polydimethylsiloxane and 20 g of the blue pigment dye of Colour Index No. 74160 are added, and the mixture is stirred for a further two minutes at 10,000 revolutions per minute.

The printing paste obtained is subsequently printed onto a cotton fabric using a flat film printing machine. The fabric is then dried for two minutes at 100° C. and subsequently fixed for 5 minutes at 150° C. A blue, intensely colored, flat print having sharp contours, a soft hand and good rub, washing and dry-cleaning fastness properties is obtained.

Example 65

12 g of the pulverulent polymer prepared as described in Example 3 are scattered with stirring into 844 g of drinking water. The mixture is stirred for four minutes using a high-speed stirrer at 10,000 revolutions per minute, to give a clear, homogeneous paste in which the thickener is fully swollen through. Then, 4 g of a 25% strength aqueous ammonia solution, 120 g of a commercially available binder based on a 40% strength copolymer dispersion comprising butyl acrylate, styrene, acrylic acid and N-methylol-methacrylamide and 20 g of the blue pigment dye of Colour Index No. 74160 are added, and the mixture is stirred for a further two minutes at 8,000 revolutions per minute.

The printing paste obtained is subsequently printed onto a cotton fabric using a flat film printing machine. The fabric is dried for two minutes at 120° C. and fixed for four minutes using hot air at 160° C. A blue, intensely colored, flat print having sharp contours and good rub and washing fastness properties is obtained.

Example 66

8.5 g of the polymer prepared as described in Example 4 are scattered with stirring into a mixture of 847.5 g of drinking water, 4 g of a 25% strength ammonia solution, 10 g of a commercially available fixer based on a hexamethoxymethylmelamine and 120 g of a commercially available binder based on a 45% strength copolymer dispersion comprising butyl acrylate, styrene and N-methylolmethacrylamide.

The batch is stirred for four minutes using a high-speed stirrer at 10,000 revolutions per minute. Then, 10 g of the red pigment dye of Colour Index No. 12485 are added, and the mixture is stirred for a further one minute at 5,000 revolutions per minute.

The printing paste obtained is subsequently printed onto a mixed fabric comprising 67% of polyester and 33% of cotton using a flat film printing screen. The fabric is then dried for 2 minutes at 100° C. and fixed for 5 minutes using hot air at 150° C. A blue, intensely colored, bright red, flat print having sharp contours, a soft hand and good rub, washing and dry-cleaning fastness properties is obtained.

Example 67

Example 63 is repeated, but replacing the thickener indicated therein by 10.2 g of the polymer obtained as described in Example 5. A blue, intensely colored, flat print having sharp contours, a soft hand and good rub, washing and dry-cleaning properties is obtained.

Example 68

Example 63 is repeated, but replacing the thickener indicated therein by 10 g of the polymer obtained as described in Example 6. An intensely colored, flat, blue print having sharp contours, a soft hand and good rub, washing and dry-cleaning properties results.

Example 69

Example 64 is repeated, but replacing the thickener indicated therein by 10.3 g of the polymer obtained as described in Example 7. An intensely colored, flat, blue print having a soft hand and good rub, washing and dry-cleaning fastness properties is obtained.

Example 70

Example 64 is repeated, but replacing the thickener indicated therein by 10.6 g of the polymer obtained as described in Example 8. An intensely colored, flat, blue print having a soft hand and good rub, washing and dry-cleaning fastness properties is obtained.

Example 71

9.5 g of the pulverulent polymer prepared as described in Example 9 are scattered with stirring into 960.5 g of water of 15° German hardness. Subsequently, 30 g of the blue dispersion dye of the formula

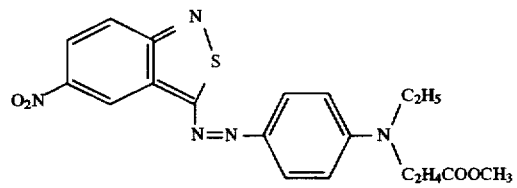

in the liquid, nonionogenic, finished commercial form are added, and the batch is stirred for three minutes using a high-speed stirrer at 10,000 revolutions per minute.

The printing paste obtained in this way is printed onto a knitted polyester fabric using a flat film printing screen. The print is dried for 3 minutes at 100° C. and fixed for 10 minutes using steam at 170° C. A very intensely colored, blue, flat print with sharp contours and a soft hand is obtained.

Example 72

28.1 g of the pulverulent polymer prepared as described in Example 10 are scattered with stirring into 801.9 g of distilled water. The mixture is then homogenized for three minutes at 12,000 revolutions per minute using a high-speed stirrer. Subsequently, 120 g of urea, 25 g of soda, 10 g of the sodium salt of m-nitrobenzenesulfonic acid, 5 g of sodium metaphosphate and 10 g of the pulverulent, blue reactive dye of Colour Index No. 61205 are added successively with stirring, and the mixture is homogenized for 3 minutes at 10,000 revolutions per minute. The printing paste obtained is printed onto a cotton fabric using a flat film printing machine. The fabric is subsequently dried for 2 minutes at 110° C. and fixed for 10 minutes using saturated steam at 102° C. The goods are rinsed successively with water at 20° C. and at 60° C. and boiled with a washing liquor containing 2 g/l of the product of the adduct formation between 8 mol of ethylene oxide and nonylphenol. The goods are again rinsed at 20° C. and dried. A very intensely colored, flat, soft, blue print with sharp contours is obtained.

Example 73

5.4 g of the pulverulent polymer prepared as described in Example 11 are scattered with stirring into 544.6 g of drinking water. The batch begins to thicken after only a few seconds. The mixture is subsequently stirred for two minutes using a high-speed stirrer at 8,000 rpm.

300 g of naphtha are emulsified into the homogeneous, viscous batch in one minute with stirring at 8,000 revolutions per minute. Stirring is then continued for one minute at 10,000 revolutions per minute, and 120 g of a commercially available binder based on a 45% strength aqueous copolymer dispersion comprising butadiene, styrene, acrylonitrile and N-methylolmethacrylamide, and

29

30 parts of the red pigment dye of Colour Index No. 12475 are added. The mixture is stirred for a further two minutes at 10,000 revolutions per minute.

The printing paste obtained is then printed onto a cotton fabric using a roller printing machine. The print is dried for 3 minutes at 100° C. and fixed for 5 minutes using hot air at 150° C. A bright, intensely colored, flat, red print with sharp contours, a soft hand and good rub, wet and washing fastness properties is obtained.

Example 74

34.2 g of the pulverulent, non-dusting polymer prepared as described in Example 12 are scattered with stirring into a solution of 100 g of urea,
25 g of soda,
33.3 g of 30% strength sodium hydroxide solution and
1.5 g of a commercially available product of adduct formation between 10 mol of ethylene oxide and 1 mol of isooctylphenol in
781 g of distilled water. The mixture is stirred for three minutes at 10,000 revolutions per minute and
25 g of commercially available yellow reactive dye of Colour Index No. 13245 are added, and the mixture is again homogenized by stirring for two minutes at 5,000 revolutions per minute.

The printing paste obtained is printed onto a viscose staple fabric using a flat film printing screen. The fabric is subsequently dried for 2 minutes at 110° C. and fixed for 8 minutes using saturated steam at 102° to 104° C. The goods are then first rinsed at 15° to 20° C. and then at 60° C. and boiled with a washing liquor containing 2 g/l of 50% strength sodium hydroxide solution and 2 g/l of the sodium salt of ethylenediaminetetraacetic acid. The goods are then rinsed with water at 15° to 20° C. until neutral and subsequently dried. A very intensely colored, flat, soft, reddish-yellow print with sharp contours is obtained.

Example 75

12.1 g of the pulverulent polymer prepared as described in Example 13 are scattered with stirring into
952.7 g of drinking water. The mixture is subsequently stirred for two minutes using a high-speed stirrer at 10,000 revolutions per minute,
5.2 g of 50% strength sodium hydroxide solution are added, and the mixture is stirred for a further two minutes at 10,000 revolutions per minute. A highly viscous, smooth paste is obtained. Then,
30 g of the blue dispersion dye of the formula

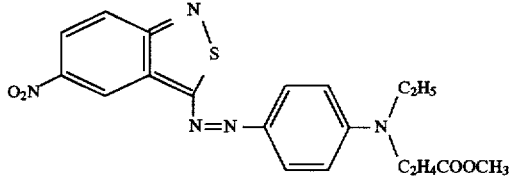

in the liquid, nonionogenic, finished commercial form are added, and the batch is homogenized for one minute at 10,000 revolutions per minute.

The printing paste obtained in this way is printed onto a polyester satin fabric using a flat film printing screen. The fabric is then dried for 3 minutes at 100° C. and then fixed for 6 minutes using steam at 175° C. The print obtained is first rinsed with cold water then with water at 60° C. The fabric is then subjected to reductive cleaning at 60° C. using a washing liquor containing 2 g/l of 50% strength sodium hydroxide solution, 2 g/l of sodium dithionite and 2 g/l of a wetting agent based on a product of the adduct formation between 8 mol of ethylene oxide and 1 mol of nonylphenol. The goods are then rinsed with cold water and dried. A very intensely colored, blue, level print with a soft hand and sharp contours is obtained.

Example 76

Example 65 is repeated, but the thickener indicated therein is replaced by 25.5 g of the polymer obtained as described in Example 14. A blue print with sharp contours and good rub and washing fastness properties results.

Example 77

Example 65 is repeated, but the thickener indicated therein is replaced by 17 g of the polymer obtained as described in Example 5. A blue print having good rub and washing fastness properties is obtained.

Example 78

851.4 g of drinking water are introduced into a plastic beaker of capacity 2 l. While the water is stirred by a manually operated, broad plastic spatula,
8.6 g of the pulverulent polymer from Example 16 are slowly scattered in. The batch begins to thicken after only 1 minute. Stirring with the spatula is then continued; a homogeneous, highly viscous paste is obtained after only 8 minutes. Subsequently,
120 g of a commercially available binder based on a 45% strength copolymer dispersion comprising butyl acrylate, styrene and N-methylolmethacrylamide, and
20 g of the blue pigment dye of Colour Index No. 74160 are added, and stirring with the spatula is continued until the batch is homogeneous and the dye is uniformly distributed, which requires about 2 to 3 minutes.

The printing paste obtained is finally printed onto a cotton fabric using a flat film printing screen. The fabric is dried for 2 minutes at 100° C. and then fixed for 5 minutes using hot air at 140° C. A blue print having a soft hand and good rub, washing and dry-cleaning fastness properties is obtained.

Example 79

Example 66 is repeated, but the thickener indicated therein is replaced by 11.5 g of the polymer obtained as described in Example 17. A bright red print having good rub, washing and dry-cleaning fastness properties is obtained.

Example 80

Example 78 is repeated, but the thickener indicated therein is replaced by the same amount of the polymer obtained as described in Example 18. A blue print which corresponds to the print produced as described in Example 78 with respect to color intensity, levelness, contour sharpness, hand and fastness properties.

Example 81

Example 66 is repeated, but the thickener indicated therein is replaced by 15 g of the polymer prepared as described in Example 19. A bright red print having a soft hand and good rub, washing and dry-cleaning fastness properties results.

Example 82

Example 63 is repeated, but the thickener indicated therein is replaced by 9.9 parts of the polymer prepared as described in Example 31. A blue print which corresponds, with respect to color intensity, levelness, contour sharpness, hand and fastness properties, to the print achieved using a corresponding amount of polymer in the form of the commercially available water-in-oil polymer emulsion as thickener.

Example 83

Example 63 is repeated, but the thickener used therein is replaced by 10 parts of the polymer prepared as described in Example 32. A blue print which corresponds, with respect to color intensity, levelness, contour sharpness, hand and fastness properties, to the print achieved using the same amount of polymer in the form of the commercially available water-in-oil polymer emulsion is obtained.

Example 84

Example 63 is repeated, but the thickener used therein is replaced by 12.9 g of the pulverulent polymer prepared as described in Example 33 together with 5 g of 25% aqueous ammonia solution. A blue print which corresponds, with respect to color intensity, levelness, contour sharpness, handle and fastness properties, to the print obtainable using the same amount of polymer in the form of the commercially available water-in-oil polymer emulsion is obtained.

We claim:

1. A process for the preparation of a finely divided polymer powder comprising:
   i) polymerizing water-soluble monomers in the aqueous phase of a water-in-oil emulsion in the presence of
      (a) a water-in-oil emulsifier;
      (b) from 50 to 5,000 ppm of at least one crosslinking agent;
      (c) from 1 to 20% by weight, based on the monomers employed in the polymerization of at least one oil-in-water emulsifier; and
      (d) free-radical polymerization initiators;
   (ii) adding a protective colloid to the water-in-oil emulsion in an amount of from 0.1 to 10% by weight, based on the polymer, after the polymerization is complete;
   (iii) removing water from the resultant water-in-oil polymer suspension by azeotropic distillation; and
   (iv) isolating the suspended finely divided polymer powder;
   wherein sorbitan esters are not employed as both said water-in-oil emulsifier and said protective colloid and
   wherein said finely divided polymer powder consists of an agglomeration of primary particles having a mean particle size of from 0.1 to 20 µm.

2. The process as claimed in claim 1, wherein the protective colloids employed are sorbitan esters or polymers usually employed in reverse suspension polymerization.

3. A process as claimed in claim 1, wherein the removal of the water from thw water-in-oil polymer emulsion by azeotropic distillation is additionally carried out in the presence of from 0.5 to 10% by weight, based on the total polmer emulsion, of a polar organic solvent as agglomeration aid, or the agglomeration aid is added to the polmer suspension after removal of the water.

4. The process of claim 2, wherein the protective colloids are polymers have a K value of from 40 to 50 in 1% strength solution of cyclohexanone.

5. A finely divided crosslinked polymer powder comprising agglomerates of primary particles which have a mean particle size of from 0.1 to 20 µm, wherein the agglomerates, when introduced into water, disintegrate into the primary particles and wherein the polymer powder is obtained by the steps comprising:
   i) polymerizing water-soluble monomers in the aqueous phase of a water-in-oil emulsion in the presence of
      (a) a water-in-oil emulsifier;
      (b) from 50 to 5,000 ppm of at least one crosslinking agent;
      (c) from 1 to 20% by weight, based on the monomers employed in the polymerization of at least one oil-in-water emulsifier; and
      (d) free-radical polymerization initiators;
   (ii) adding a protective colloid to the water-in-oil emulsion in an amount of from 0.1 to 10% by weight, based on the polymer after the polymerization is complete;
   (iii) removing water from the resultant water-in-oil polymer suspension by azeotropic distillation; and
   (iv) isolating the suspended finely divided polymer powder;
   wherein sorbitan esters are not employed as both said water-in-oil emulsifier and said protective colloid.

6. The process of claim 1, wherein said finely divided polymer powder is isolated by filtration or centrifugation.

* * * * *